United States Patent
Wong (10) Patent No.: US 12,049,942 B2
(45) Date of Patent: Jul. 30, 2024

(54) CREATING A CURLING EFFECT

(71) Applicant: Disney Enterprises, Inc., Burbank, CA (US)

(72) Inventor: Clifford Wong, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 817 days.

(21) Appl. No.: 17/109,879

(22) Filed: Dec. 2, 2020

(65) Prior Publication Data

US 2022/0170531 A1 Jun. 2, 2022

(51) Int. Cl.
*F16G 15/12* (2006.01)
*A63H 13/02* (2006.01)
*F16G 13/07* (2006.01)

(52) U.S. Cl.
CPC ............. *F16G 15/12* (2013.01); *A63H 13/02* (2013.01); *F16G 13/07* (2013.01)

(58) Field of Classification Search
CPC .......... F16G 13/07; F16G 13/16; F16G 15/12; F16G 13/18; H02G 3/0475; H02G 11/006
USPC .......................................................... 59/78.1
See application file for complete search history.

(56) References Cited

U.S. PATENT DOCUMENTS

| | | | | |
|---|---|---|---|---|
| 2,460,524 A | * | 2/1949 | Morin | B22D 25/023 59/78 |
| RE33,339 E | * | 9/1990 | Heidrich | F16G 13/16 59/78 |
| 6,065,278 A | * | 5/2000 | Weber | F16G 13/16 59/78.1 |
| 2015/0175357 A1 | * | 6/2015 | Wolff | F16G 15/12 198/867.09 |

\* cited by examiner

*Primary Examiner* — Bobby Yeonjin Kim
*Assistant Examiner* — Jared O Brown
(74) *Attorney, Agent, or Firm* — Patterson + Sheridan, LLP (57) ABSTRACT

A curling effect is provided via a system, which may be included in an article, via a plurality of links, including distal, proximal, and intermediary links, that each comprise: a base; first and second wings, connected to opposite sides of the base such that each of first and second through-holes are aligned at a first height; and a header, connected between the wings that defines a third through-hole at the first height and a fourth through-hole at a second height different from the first height that is configured to accept a stringer therethrough so that a force applied on the stringer in a direction from the distal link towards the proximal link causes rotation of neighboring links relative to one another; the neighboring links being joined via a linking axel disposed on a shared axis through the first, second, and third through-holes of the neighboring links.

15 Claims, 6 Drawing Sheets

CREATING A CURLING EFFECT

BACKGROUND

Various articles, including toys, clothing, and novelties, rely on particular motions and shapes to convey an aesthetic or perform a specific function. One of the more difficult to achieve motions or shapes is a curling of an otherwise straight object.

SUMMARY

The present disclosure provides, in one aspect, a link for a chain, comprising: a base; a first wing connected on a first side of the base perpendicular to the base, wherein the first wing defines a first through-hole; a second wing connected on a second side of the base perpendicular to the base and opposite to the first side, wherein the second wing defines a second through-hole aligned with the first through-hole; and a header connected on a third side of the base perpendicular to the base, the first wing, and the second wing, wherein the header defines a third through-hole in a parallel plane to the first through-hole and the second through-hole and defines a fourth through-hole in a perpendicular plane to the third through-hole.

The present disclosure provides, in one aspect, a system, comprising: a plurality of links, including a distal link, a proximal link, and at least one intermediary link, wherein each link of the plurality of links comprises: a base; a first wing, connected to a first side of the base; a second wing, connected to a second side of the base opposite to the first side; and a header, connected to a third side of the base perpendicular to the first side and the second side; wherein the first wing defines a first through-hole at a first height relative to the base; wherein the second wing defines a second through-hole at the first height and aligned with the first through-hole; wherein the header defines a third through-hole at the first height in a parallel plane to the first through-hole; and wherein the header defines a fourth through-hole at a second height different from the first height in a perpendicular plane to the first through-hole; a plurality of linking axles, wherein each linking axle of the plurality of linking axles is disposed through the first through-hole and the second through-hole of a first link of the plurality of links and the third through-hole of a second link of the plurality of links; and a stringer disposed through the fourth through-hole of each link of the plurality of links and secured to the distal link, wherein a force applied on the stringer in a direction from the distal link towards the proximal link causes rotation of the first link relative to the second link for at least one linking axle of the plurality of linking axles.

The present disclosure provides, in one aspect, an article, comprising: a sleeve, having a first end and a second end opposite to the first end; a curling device disposed in the sleeve, the curling device including a plurality of links connected by a plurality of linking axles; and a stringer disposed through the plurality of links and extending outside of the sleeve through the second end, configured to apply a torque to the curling device when pulled in a direction from the first end towards the second end.

BRIEF DESCRIPTION OF THE DRAWINGS

So that the manner in which the above recited aspects are attained and can be understood in detail, a more particular description of embodiments described herein, briefly summarized above, may be had by reference to the appended drawings.

It is to be noted, however, that the appended drawings illustrate typical embodiments and are therefore not to be considered limiting; other equally effective embodiments are contemplated.

DETAILED DESCRIPTION

The present disclosure provides a mechanical device configured to allow a user to selectively control the amount of rigidity in an otherwise non-rigid article, to thereby impart or relax a curling effect in at least a portion of that article. The curling device discussed herein may be deployed in various articles with one or more instances thereof that are separately or jointly controlled. A series of links are joined together to control the curling effect via a stringer connected to (or directly providing) a control interface for a user. When the user draws the stringer (e.g., a cable), the curling device imparts a curling effect on the article proportional to the amount that the user has drawn the stringer. Similarly, when the user releases the stringer, the curling device relaxes the curling effect on the article proportional to the amount that the user has released the stringer.

The examples of non-rigid articles given herein generally relate to textile based articles lacking support structures in the areas or zones in which the curling devices are disposed. Although a textile shell (or associated stuffing or batting) can provide a nominal amount of structure for an article, the ability to bend, fold, stretch, crumple, or otherwise deform the article with the article permanently deforming distinguishes non-rigid articles from rigid articles. Accordingly, the curling devices of the present disclosure provide for the articulation of non-rigid articles while permitting that article to retain the ability to flexibly and non-permanently deform (or at least the appearance that the article may do so).

FIGS. 1A-1E illustrate several views of a link 100 for use in a curling device, according to aspects of the present disclosure. The curling device is made of a series of such links 100 joined together via various through-holes. Although illustrated with a given set of proportions in FIGS. 1A-1E between the various elements of the link 100, other sets of proportions are contemplated, which can be used to alter how the curling device curls the associated article. Accordingly, the relative sizes and shapes of the various elements of the link 100 are provided as non-limiting examples.

Figure 1A:
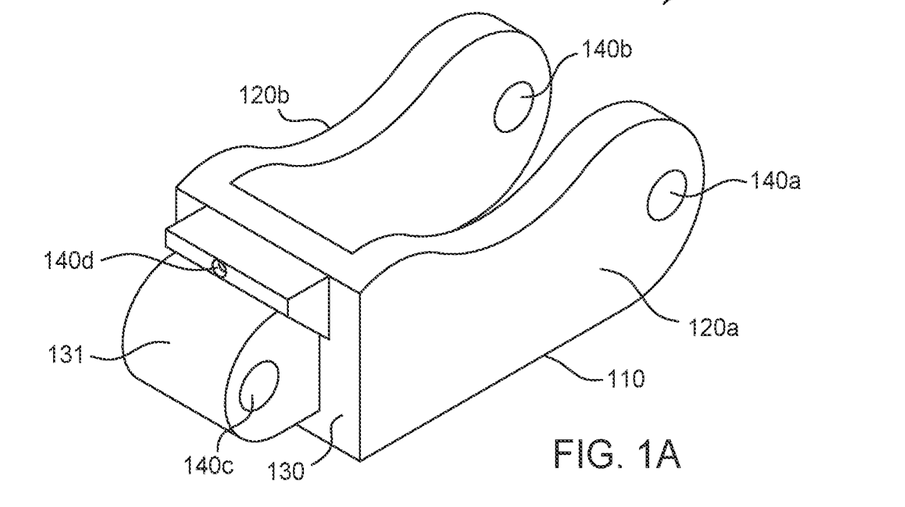
FIGS. 1A-1E illustrate several views of a segment for use in a curling device, according to aspects of the present disclosure.
Figure 1B:
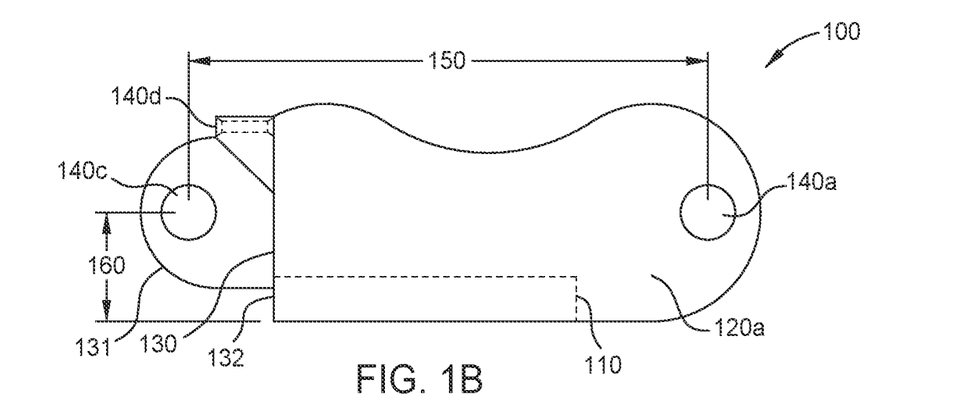
Figure 1C:
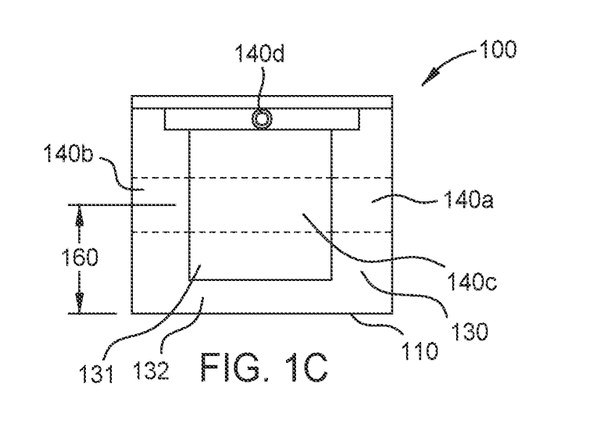
Figure 1D:
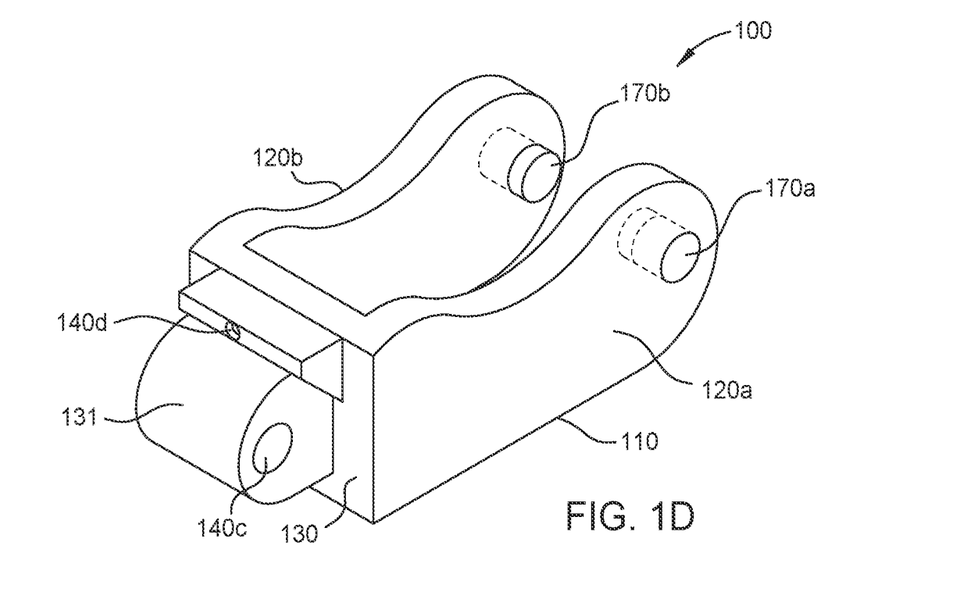
Figure 1E:
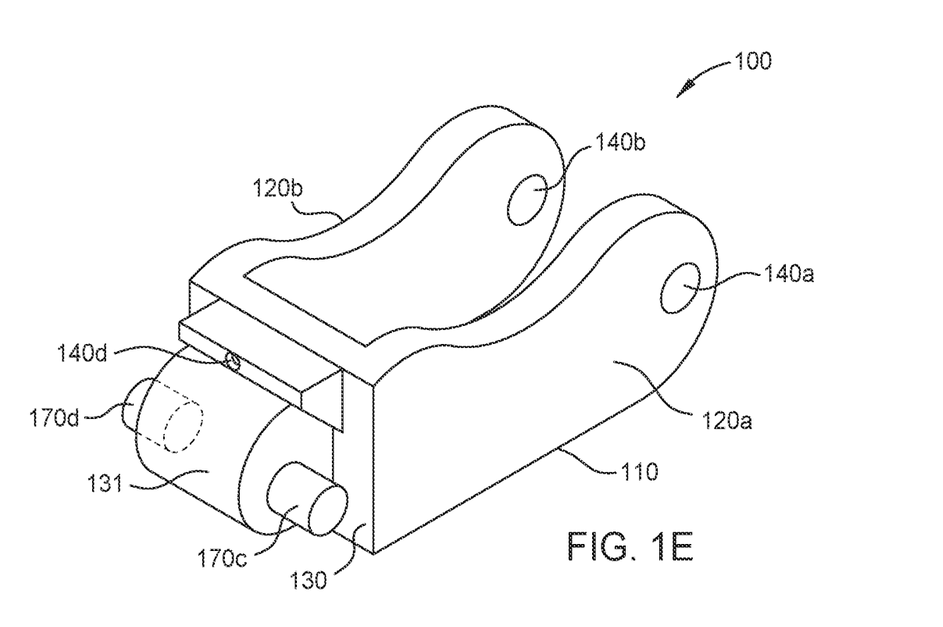

The link 100 includes a base 110 from which a first wing 120a (generally or collectively, wings 120), a second wing 120b, and a header 130 extend perpendicularly from the base 110. The first wing 120a is connected on a first side of the base 110 opposite to a second side from which the second wing 120*b* extends. In FIGS. 1A-1D, the wings 120 are aligned with one another so that a first through-hole 140*a* defined in the first wing 120*a* aligns with a second through-hole 140*b* defined in the second wing 120*b*. In FIG. 1D, in place of the first through-hole 140*a* and the second through-hole 140*b*, the wings 120 define a first spoke 170*a* (generally or collectively, spokes 170) and a second spoke 170*b*, respectively, which are aligned with one another.

The header 130, which is connected to a third side of the base 110 (perpendicular to both the first and second sides) defines a third through-hole 140*c* in FIGS. 1A-1C and 1E, and defines a fourth through-hole 140*d* in FIGS. 1A-1E. In FIG. 1D, the header 130 defines a third spoke 170*c* and a fourth spoke 170*d* in place of the third through-hole 140*c*. The third through-hole 140*c* (or third spoke 170*c* and fourth spoke 170*d*) and the fourth through-hole 140*d* are defined in an extension 131 of the header 130. In various aspects, the header 130 includes a stop 132 below the extension 131, configured to engage with the base 110 of a connected (different) link 100 to prevent rotation of the two links 100 relative to one another beyond a given angle of rotation. The given angle of rotation may vary in different examples, but allows for a series of interconnected links 100 to move in two directions (e.g., positive rotation and negative rotation) from a neutral position within a threshold of motion, thereby allowing any non-rigid article that the links 100 are included in to retain a pliable and fluid appearance.

In aspects using the first through third through-holes 140*a-c*, the third through-hole 140*c* is defined in a first plane parallel to the first through-hole 140*a* and the second through-hole 140*b*, and is configured to be aligned with the first through-hole 140*a* and the second through-hole 140*b* of a different link 100 to form a segment in the curling device described herein (e.g., via an inserted axle). In aspects using spokes 170 in place of the first through-hole 140*a* and the second through-hole 140*b*, such as in FIG. 1D, the first spoke 170*a* and the second spoke 170*b* are configured to be aligned with and engage a third through-hole 140*c* of another link 100. Similarly, in aspects using spokes 170 in place of the third through-hole 140*c*, such as in FIG. 1E, the third spoke 170*c* is configured to be aligned with and engage the first through-hole 140*a* and the fourth spoke 170*d* is configured to be aligned with and engage the second through-hole 140*b* of another link 100.

In various aspects, the first through-hole 140*a*, the second through-hole 140*b*, and the third through-hole 140*c* are defined at a shared size and at a shared height 150 (relative to the base 110) for ease of alignment and linkage. In the illustrated example, the distance 160 between the center of the third through-hole 140*c* and the centers of the first through-hole 140*a* and the second through-hole 140*b* (measured in a shared plane) is four times the shared height 150. In aspects using paired spokes 170 and through-holes 140, the various spokes 170 are sized and positioned to fit into the corresponding through-holes 140. Although illustrated in FIGS. 1D and 1E as generally cylindrical in shape, in various aspects, the spokes 170 can include conic shapes or beveling on the distal ends to aid in assembly.

The fourth through-hole 140*d* is placed above the axis of rotation formed by complementary first through third through-holes 140*a-c* of two connected links 100. The diameter of the fourth through-hole 140*d* is set according to the diameter of the intended stringer that runs through the respective fourth through-holes 140*d* of the connected links 100, and includes a chamfer of both ends (e.g., to reduce wear on the stringer, smooth the curling motion of the completed curling device, aid in running the stringer, etc.).

Figure 2A:
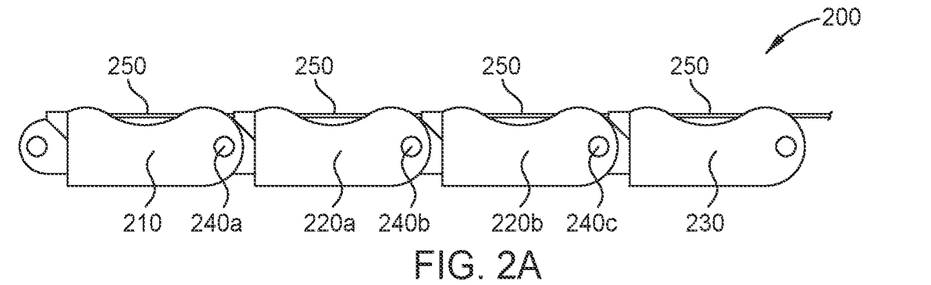
FIGS. 2A-2C illustrate several views of a curling device in different modes of operation, according to aspects of the present disclosure.
Figure 2B:
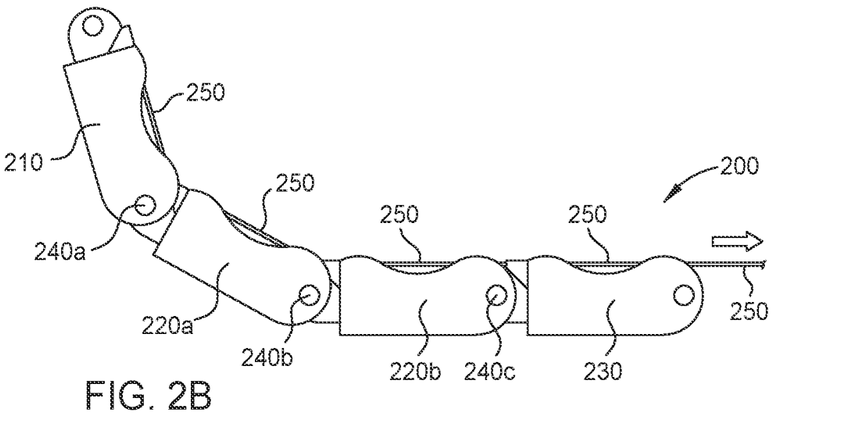
Figure 2C:
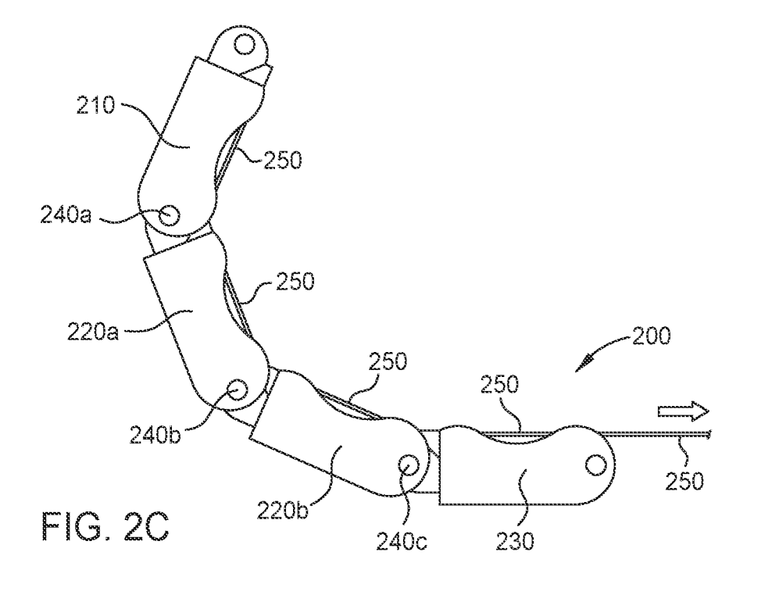

FIGS. 2A-2C illustrate several views of a curling device 200 in different modes of operation, according to aspects of the present disclosure. The curling device 200 in FIGS. 2A-2C includes a series of four links (100) that includes a distal link 210 (that is furthest from the control interface for the curling device 200), a first intermediate link 220*a* (generally or collectively, intermediate link 220), a second intermediate link 220*b*, and a proximal link 230 (that is closest to the control interface for the curling device 200). Although illustrated with two intermediate links 230, any number of intermediate links 230 may be disposed between the distal link 210 and the proximal link 240 in various aspects.

In some aspects, the various distal links 210, intermediate links 220, and proximal links 230 may all conform to a single size and shape of link (100), to produce an even curling effect. In other aspects, various different sizes or shapes of link (100) can be used for the various distal links 210, intermediate links 220, and proximal links 230 to thereby produce a varied curling effect along the length of the chain.

In some aspects, each link (100) is connected to at least one other link (100) in the curling device 200 via an axle 240*a-d* (generally or collectively axle 240) inserted through the corresponding first and second through-holes (140*a-b*) of one link (100) and the third through-hole (140*c*) of the other link (100). In other aspects, each link (100) is connected to at least one other link (100) in the curling device 200 via spokes 170 protruding from the wings (120) or the header (130) of the links.

In various aspects, the first and second through-holes (140*a-b*) of the proximal link 230 are connected to a proximal anchor point in the article that the curling device 200 is disposed in to produce the curling effect. The anchor point can allow the proximal link 230 to rotate with the other links (100) or keep the proximal link 230 in place, depending on the set up of the article. Additionally or alternatively, the third through-hole (140*c*) of the distal link 210 is connected to a distant anchor point in the article that the curling device 200 is disposed in to produce the curling effect. Connecting the curling device 200 to various anchor points in the article keeps the curling device 200 in place, and ensures an even curling effect.

The curling effect is produced by (or relaxed by) imparting a torque on the links (100) via a level of tension in a stringer 250 run through the corresponding fourth through-holes (140*d*) of the links (100) in the curling device 200. Tension applied by the stringer 250 causes each link (100) to rotate about the axle 240 connected to the next-proximal link (100) in the curling device 200. For example, in FIG. 2A, when no tension is applied via the stringer 250, the various links (100) are in an un-curled state. However, when a first tension level is applied via the stringer 250 (as in FIG. 2B), the distal link 210 rotates about the first axle 240*a*, and the first intermediate link 220*a* rotates about the second axle 240*b*.

Depending on the amount of tension supplied via the stringer 250, not all links (100) may rotate, but as more tension is supplied, more links (100) rotate about the respective axles 240, and to a greater extent. For example, in FIG. 2C, where a greater tension is applied than in FIG. 2B, the distal link 210 has rotated at a greater angle about the first axle 240*a* than in FIG. 2B, and the second intermediate link 220b has rotated about the third axle 240c, where that second intermediate link 220b had not rotated about the third axle 240c in FIG. 2B.

Once the tension on the stringer 250 relaxes, the curling device 200 can resume a relaxed state (e.g., as shown in FIG. 2A) based on gravity pulling the links (100) back in line, springs disposed between each of the links (100) biasing the curling device 200 to the relaxed state, or another force acting on the links (100).

In various aspects, the stringer 250 may be any string, twine, rope, or cable that is secured to the proximal link 230. A force applied on the stringer 250 in a direction from the distal link 210 towards the proximal link 230 (i.e., a pull) creates the curling effect, while releasing the force relaxes the curling effect. Depending on the elasticity of the chosen material for the stringer 250, the curling effect can be more uniform over the length of the curling device 200 (e.g., with a more rigid stringer 250) or more variable over the length of the curling device 200 (e.g., with a more elastic stringer 250).

In various aspects, the stringer 250 is secured via a knot in the material of the stringer 250 located on the distal side of the fourth-through-hole (140d) of the distal link 210, an epoxy securing a portion of the stringer 250 in the fourth through-hole (140d), a tension block inserted into the fourth through-hole (140d) with a portion of the stringer 250, combinations thereof, or other means. Depending on the article that the curling device 200 is disposed within, the proximal end of the stringer 250 may be used as the control interface or connected by various means to various types of control interfaces by which a user may apply the tension to create the curling effect.

Figure 3A:
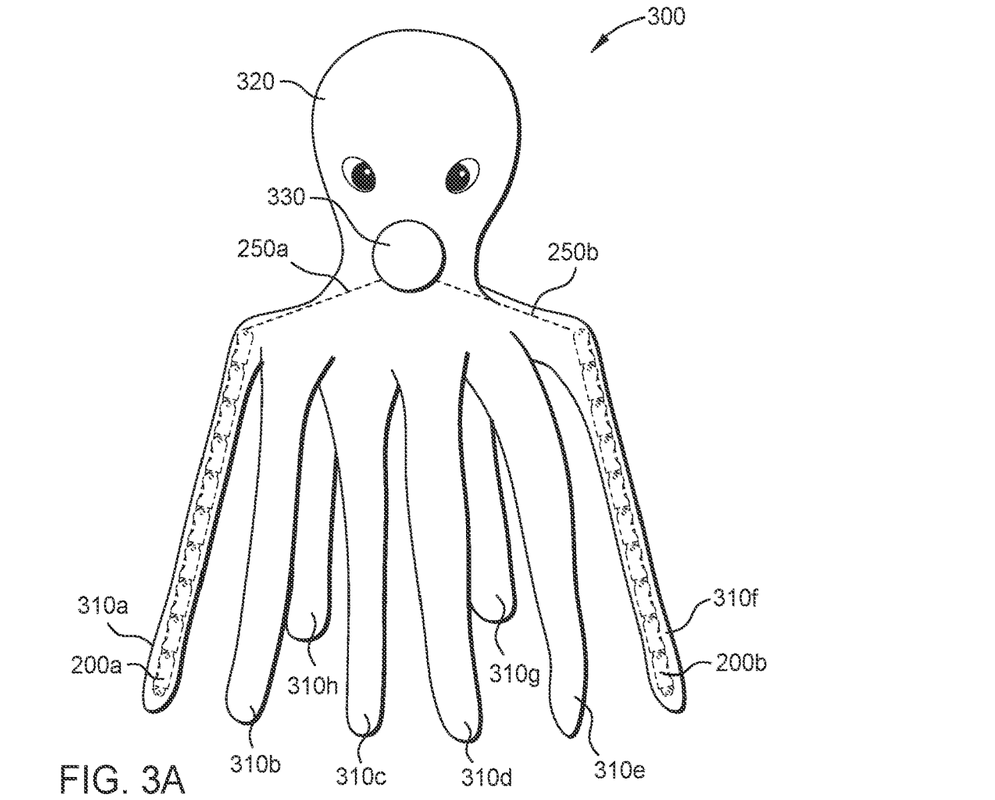
FIGS. 3A and 3B illustrate a toy incorporating several instances of a curling device, according to aspects of the present disclosure.
Figure 3B:
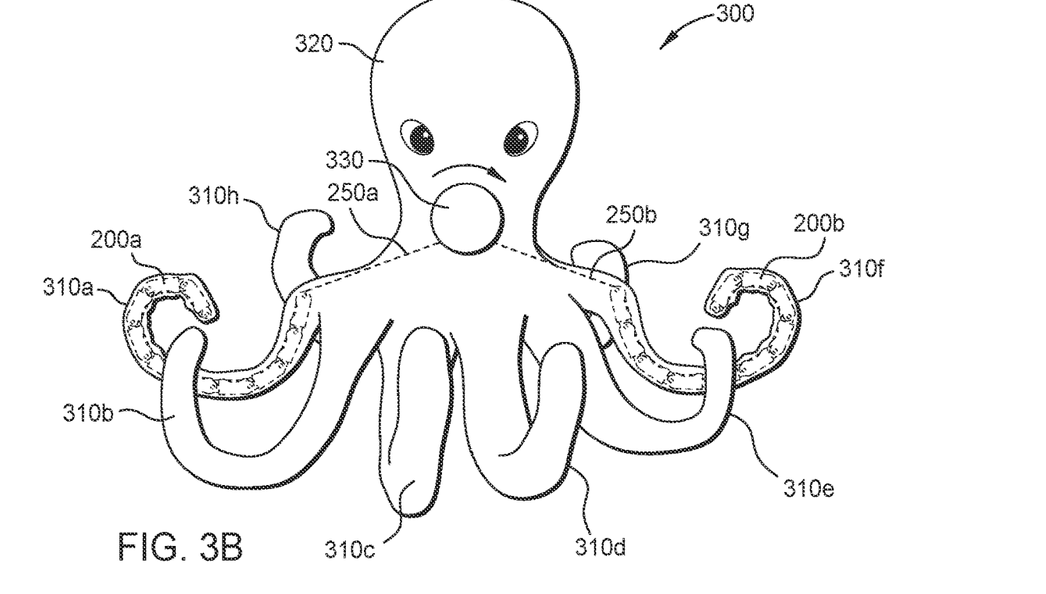

FIGS. 3A and 3B illustrate a toy 300 incorporating several instances of a curling device (200) with a shared alignment, according to aspects of the present disclosure. For example, each arm 310a-h (generally or collectively, arm 310) of a toy 300 of a plush octopus may include a separate curling device (200). For simplicity, FIGS. 3A and 3B are illustrated showing a first curling device 200a and a second curling device 200b interior to a first arm 310a and a sixth arm 310f, respectively, and leaving the other curling device (200) in the other arms 310 unillustrated.

The stringer (250) from each curling device (200) may be routed through the body 320 of the toy 300 and combined at one control interface 330. The control interface 330 provides a single point of interaction for a user of the toy 300 to control the several arms 310a-h via the associated curling devices (200) therein. In various aspects, the control interface 330 includes a winding wheel that some or all of the stringers (250) are connected to that imparts the curling force on the curling devices (200) by winding the stringers (250) about an axle. In other aspects, the control interface 330 is a connection point for the various stringers (250) that is pulled or released to impart or relax the curling force on several stringers (250) simultaneously via a single pull or release from a user. In various aspects, the control interface 330 may be electronically controlled (e.g., with a battery operated motor) via a button or wireless signal. Accordingly, the toy 300 may begin with arms 310a-h relaxed, as in FIG. 3A, and curl all eight arms 310a-h simultaneously and to (substantially) the same extent, as in FIG. 3B, when a user interacts with a single control interface 330. Similarly, by releasing the control interface 330 (e.g., unwinding a winding wheel or releasing a connection point), the toy 300 can return from the curled state in FIG. 3B to the relaxed state in FIG. 3A with a single interaction from the user.

Figure 4A:
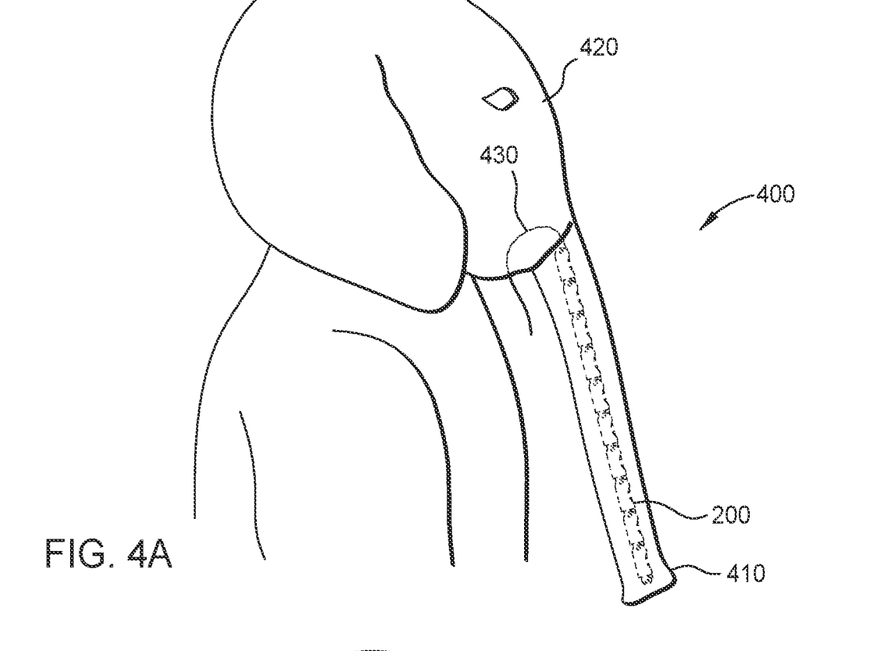
FIGS. 4A and 4B illustrate a mask incorporating several instances of a curling device, according to aspects of the present disclosure.
Figure 4B:
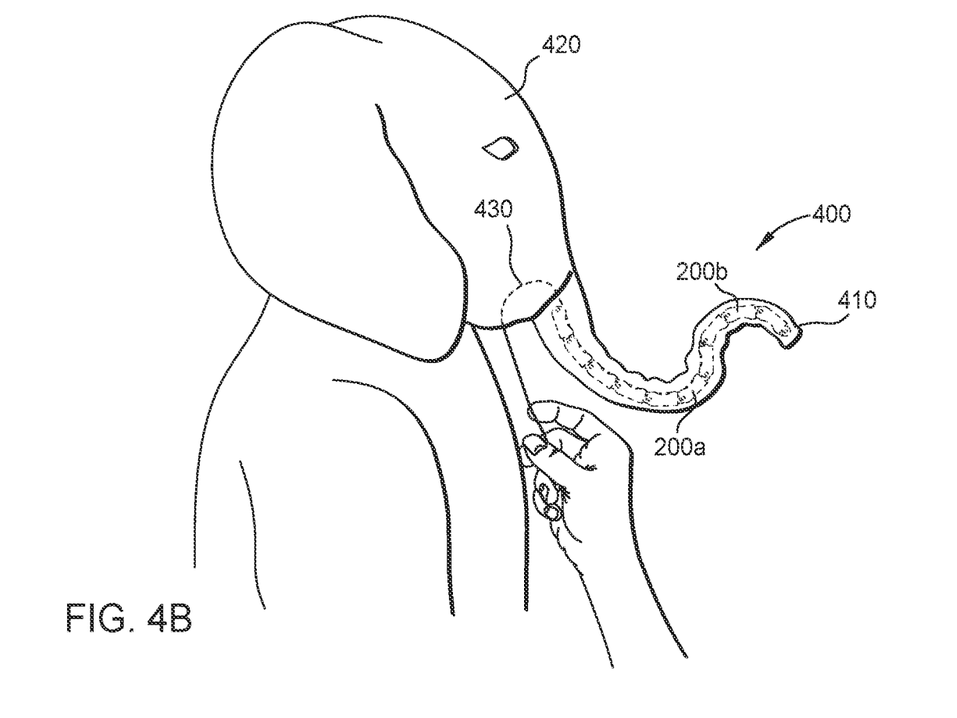

FIGS. 4A and 4B illustrate a mask 400 incorporating several instances of a curling device (200) with different alignments, according to aspects of the present disclosure. For example, a first curling device 200a and a second curling device 200b can be located are different segments of an elephant trunk 410 that is part of the mask to impart a S-curve via offsetting curling effects. Although illustrated with two offsetting curling devices 200a-b, aligned with one another, in various aspects, more than two curling devices (200) with various offsets from one another can be included in-line or out of line with one another in various articles.

In various aspects, the first curling device 200a and a second curling device 200b with offsetting curling effects can be included as different segments of one curling device (200) (as in FIGS. 4A and 4B), or may be separated from one another. When included in one curling device (200) or included in separate segments, when the first curling device 200a and a second curling device 200b are included in-line with one another, the offsetting curling device (200) can share a single shared stringer 430 to produce a combined curling effect in a single element of an article in which the curling devices (200) are disposed. In other aspects, the in-line curling devices (200) can include separate stringers (250) to produce independently controllable curling effects in the article.

The shared stringer 430 can include various interfaces to ease manipulation by a user (e.g., a handle or toggle) or may be combined with other stingers (250) at a control interface (330). Additionally or alternatively, a knot or thickened section may be formed in the shared stringer 430 to act as an interface or to reduce the likelihood of the shared stringer 430 being drawn past a given length or section in the article. For example, shared stringer 430 may exit the body 420 of the mask 400 via an opening having an eyelet with a given diameter. To prevent the shared stringer 430 from being drawn too far outside the mask 400, an internal portion of the shared stringer 430 may include a knot, a thickened section, or a toggle with a diameter greater than the eyelet to stop a user from drawing the shared stringer 430 beyond a given length. Similarly, to prevent the shared stringer 430 from being drawn too far inside of the mask 400, an external portion of the shared stringer 430 may include a knot, a thickened section, or a toggle with a diameter greater than the eyelet to stop a user from losing the shared stringer 430 within the mask 400.

When a curling effect is induced in the first curling device 200a, the resulting curl abducts the trunk 410 from the body 420 of the mask 400. In contrast, when a curling effect is induced in the second curling device 200b, the resulting curl adducts the trunk 410 towards the body 420 of the mask 400. Accordingly, the curling effect produced by two or more curling devices (200) can produce various undulations or waves depending on the number, relative lengths, and relative orientations of the several curling devices (200).

FIGS. 5A-5D illustrate a cape 500 incorporating several instances of a curling device (200), according to aspects of the present disclosure. The cape 500 shown in FIGS. 5A-5D is one example of a non-rigid article that can be provided articulation via curling devices (200) made of the links (100) described herein.

The cape 500 is a textile (or several layers of a textile) that includes a first sleeve 510a (generally or collectively, sleeve 510) and a second sleeve 510b, which may be formed of the same textile as the rest of the cap 500 or another textile. Each sleeve 510 includes an associated curling device (200) includes therein, although in some aspects, the sleeves 210 may be configured (e.g., as a openable pocket) to allow the curling devices (200) to be selectively removed (e.g., for laundering the cape 500). Although illustrated with a first curling device 200a disposed in a first sleeve 510a defined in the cape 500 and a second curling device 200b disposed in a second sleeve 510b defined in the cape 500, in various aspects, more than two curling devices (200) disposed in corresponding sleeves 510 can be included at different locations of the cape 500.

In addition to the non-rigid region 520 of the cape 500 that the sleeves 510 are disposed in, the cape 500 can include a rigid region 530 in some aspects. For example, a collar of the cape 500 can be a rigid region (e.g., to stand up while worn), while the train of the cape 500 is allowed to remain a non-rigid region 520 down the wearer's back, to freely flutter in the breeze or naturally ripple as the wearer moves, except as when controlled by the wearer via the various curling devices (200) disposed therein.

Depending on where the sleeves 510 and associated curling devices (200) are located relative to one another in the cape 500, various curling effects can be observed by manipulating the associated stringers (250). In the cape 500 illustrated in FIGS. 5A-5C, the first curling device 200a is disposed on the left side of the cape 500, near the tail of the train, and the second curling device 200b is disposed on the right side of the cape 500 at the same distance between the collar 530 and the tail as the first curling device 200a is located.

The first stringer 250a, associated with the first curling device 200a extends outward from the first sleeve 510a to an opening or securing point (e.g., an eyelet) on the right side of the cape 500, between the collar and the train. Similarly, the second stringer 250b, associated with the second curling device 200b extends outward from the second sleeve 510b to an opening or securing point on the left side of the cape 500, between the collar and the train. In various aspects, the stringers (250) are exposed from outside of the sleeves 510, while in other aspects, the stringers (250) are hidden, such as when the stringers (250) run between an outer shell and inner lining of the cape 500.

Figure 5A:
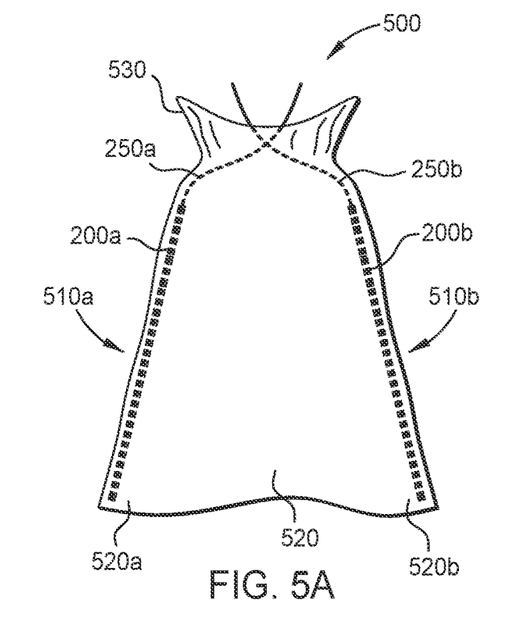
FIGS. 5A-5D illustrate a cape incorporating several instances of a curling device, according to aspects of the present disclosure.

FIG. 5A illustrates the cape 500 in a relaxed state, where a user is not exerting a force on either stringer (250) for the associated curling device (200). Accordingly, the non-rigid section 520 (e.g., the train) is allowed to hang and move freely.

Figure 5B:
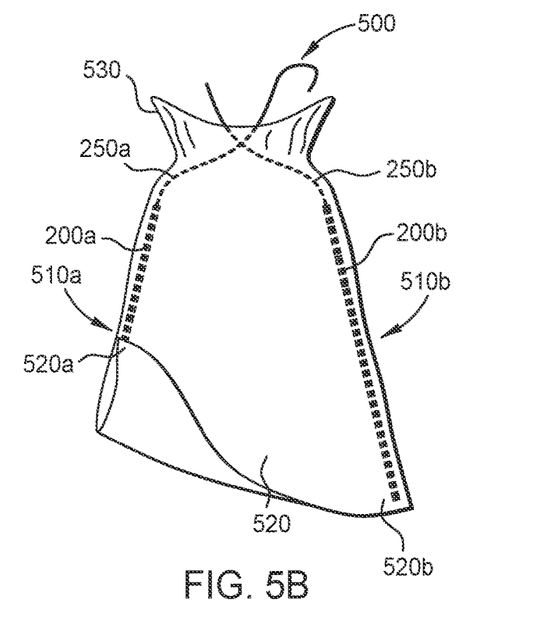

FIG. 5B illustrates the cape 500 with the user drawing the first stringer 250a to induce a curling effect in the first curling device 200a. As the non-rigid section 520 lacks supports beyond the curling devices 200a-b, the curling effect induced by the first curling device 200a rolls a portion 520a of the cape 500, primarily on the left side of the cape 500, where the first curling device 200a is disposed. Depending on where the first sleeve 510a is located on the cape 500, and to what extend the user has imparted the curling effect, a portion of the train on the left side may remain free-hanging after the curl effect has been imparted to the first curling device 200a.

Figure 5C:
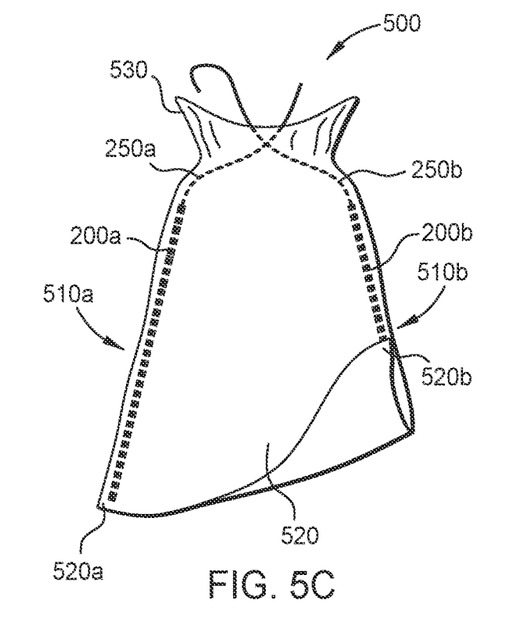

FIG. 5C illustrates the cape 500 with the user drawing the second stringer 250b to induce a curling effect in the second curling device 200b. As the non-rigid section 520 lacks supports beyond the curling devices 200a-b, the curling effect induced by the second curling device 200b rolls a portion 520b of the cape 500, primarily on the right side of the cape 500, where the second curling device 200b is disposed. Depending on where the second sleeve 510b is located on the cape 500, and to what extent the user has imparted the curling effect, a portion of the train on the right side may remain free-hanging after the curl effect has been imparted to the second curling device 200b.

Figure 5D:
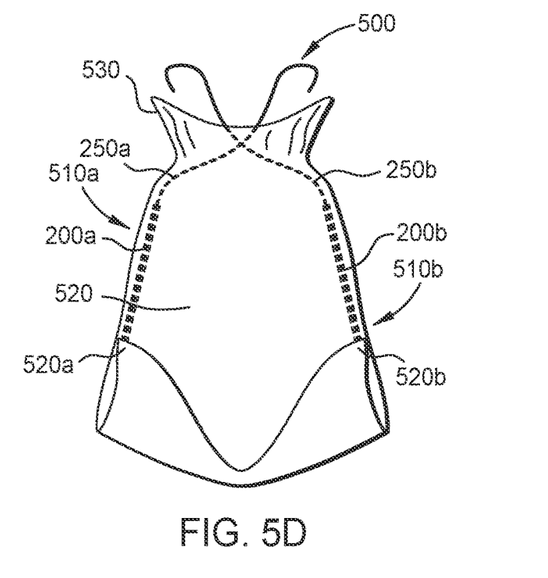

FIGS. 5B and 5C illustrate individual and separate control of the curling devices 200a-b to impart various curling effects on specific sides of the cape 500, but as is illustrated in FIG. 5D, a user may control both curling devices 200a-b in conjunction with one another (whether simultaneously or sequentially) to produce further effects in the cape 500. For example, by evenly pulling on both the first stringer 250a and the second stringer 250b or pulling on a shared control interface for the stringers 250a and 250b, a wearer of the cape 500 may roll the train of the cape 500 according to the angle of rotation for the first curling device 200a and the second curling device 200b.

In various aspects, different amounts of force applied to the stringers (250) and curling devices (200) located at different relative locations on a cape 500 with different angles of rotation can produce different effects on the non-rigid section 520 of the cape 500. Accordingly, the present illustrations are provided as non-limiting examples of the present disclosure.

In the current disclosure, reference is made to various embodiments. However, it should be understood that the present disclosure is not limited to specific described embodiments. Instead, any combination of the following features and elements, whether related to different embodiments or not, is contemplated to implement and practice the teachings provided herein. Additionally, when elements of the embodiments are described in the form of "at least one of A and B," it will be understood that embodiments including element A exclusively, including element B exclusively, and including element A and B are each contemplated. Furthermore, although some embodiments may achieve advantages over other possible solutions or over the prior art, whether or not a particular advantage is achieved by a given embodiment is not limiting of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

While the foregoing is directed to embodiments of the present disclosure, other and further embodiments of the disclosure may be devised without departing from the basic scope thereof, and the scope thereof is determined by the claims that follow.

What is claimed is:

1. A link for a chain, comprising:
   a base;
   a first wing connected on a first side of the base perpendicular to the base, wherein the first wing defines a first through-hole;
   a second wing connected on a second side of the base perpendicular to the base and opposite to the first side, wherein the second wing defines a second through-hole aligned with the first through-hole; and
   a header connected on a third side of the base perpendicular to the base, the first wing, and the second wing, wherein the header defines a third through-hole in a parallel plane to the first through-hole and the second through-hole and defines a fourth through-hole in a perpendicular plane to the third through-hole, and wherein the fourth through-hole is located at a height above the third through-hole relative to the base along a first direction defined by the link, and wherein the fourth through-hole is spaced from the third through-hole along the first direction so that the third through-hole and the fourth through-hole do not overlap along the first direction, and wherein the header has a wall that extends in a plane perpendicular to the first and second wings and to the base, and wherein the header has an extension extending from the wall in a direction opposite in which the first and second wings extend from the wall, and wherein the third through-hole and the fourth through-hole are both defined by the extension.

2. The link of claim 1, wherein the first through-hole, the second through-hole, and the third through-hole are defined at a shared size and at a shared height relative to the base.

3. The link of claim 2, wherein a distance between a center of the third through-hole and the first through-hole measured in the parallel plane is four times the shared height.

4. The link of claim 2, wherein the fourth through-hole is located at a second height relative to the base that is greater than the shared height.

5. The link of claim 1, further comprising:
an axle disposed through the first through-hole and the second through-hole and a second header of a second link, wherein the second header defines a fifth through-hole aligned with the fourth through-hole; and
a stringer disposed through the fourth through-hole and the fifth through-hole, wherein a force pulling on the stringer causes the header to rotate relative to the second header.

6. The link of claim 5, wherein the header further comprises a stop, configured to prevent rotation when the base is parallel to a base of another link coupled with the link, the stop being located below the third through-hole relative to the base along the first direction.

7. The link of claim 1, wherein the wall has a planar surface defining a stop arranged below the extension along the first direction, the stop being arranged to prevent rotation of the link and a different link connected with the link beyond a given angle of rotation.

8. The link of claim 1, wherein the extension has a curved section that defines the third through-hole and a wedge section that defines the fourth through-hole, and wherein the wedge section is wedged, at least in part, between the curved section and the wall.

9. The link of claim 8, wherein the link defines a second direction perpendicular to the first direction, and wherein the wedge section has a greater length than the curved section along the second direction.

10. The link of claim 1, wherein the wall extends between a top and a bottom along the first direction, and wherein the extension is spaced from the bottom of the wall along the first direction.

11. The link of claim 1, wherein the fourth through-hole has a first end and a second end, and wherein both the first end and the second end of the fourth through-hole are chamfered.

12. The link of claim 1, wherein the fourth through-hole has a smaller diameter than the first, second, and third through-holes.

13. A link for a chain, comprising:
a base;
a first wing connected on a first side of the base perpendicular to the base, wherein the first wing defines a first through-hole;
a second wing connected on a second side of the base perpendicular to the base and opposite to the first side, wherein the second wing defines a second through-hole aligned with the first through-hole; and
a header connected on a third side of the base perpendicular to the base, the first wing, and the second wing, wherein the header defines a third through-hole in a parallel plane to the first through-hole and the second through-hole and defines a fourth through-hole in a perpendicular plane to the third through-hole, and
wherein the header has a wall that extends in a plane perpendicular to the first and second wings and to the base, and wherein the header has an extension extending from the wall in a direction opposite in which the first and second wings extend from the wall, and wherein the third through-hole and the fourth through-hole are both defined by the extension.

14. The link of claim 13, wherein the fourth through-hole is positioned above the first, second, and third through-holes relative to the base along a first direction defined by the link, and wherein the fourth through-hole is spaced from the first, second, and third through-holes along the first direction so that the fourth through-hole does not overlap along the first direction with any of the first, second, or third through-holes.

15. A link for a chain, comprising:
a base;
a first wing connected on a first side of the base perpendicular to the base, wherein the first wing defines a first through-hole;
a second wing connected on a second side of the base perpendicular to the base and opposite to the first side, wherein the second wing defines a second through-hole aligned with the first through-hole; and
a header connected on a third side of the base perpendicular to the base, the first wing, and the second wing, wherein the header defines a third through-hole in a parallel plane to the first through-hole and the second through-hole and defines a fourth through-hole in a perpendicular plane to the third through-hole, and
wherein the fourth through-hole is placed above an axis of rotation defined by the third through-hole, and
wherein the header has a wall that extends in a plane perpendicular to the first and second wings and to the base, and wherein the header has an extension extending from the wall in a direction opposite in which the first and second wings extend from the wall, and wherein the fourth through-hole extends through the wall and the extension.

\* \* \* \* \*